May 9, 1939.　　　　H. L. DAZEY　　　　2,158,001
PHOTOGRAPHIC CONTACT PRINTING APPARATUS
Filed Feb. 15, 1937　　　4 Sheets-Sheet 1

INVENTOR.
HARRY L. DAZEY
BY
Lawrence H. Cohn
ATTORNEY.

May 9, 1939.   H. L. DAZEY   2,158,001

PHOTOGRAPHIC CONTACT PRINTING APPARATUS

Filed Feb. 15, 1937   4 Sheets—Sheet 4

INVENTOR.
HARRY L. DAZEY
BY Lawrence H. Cohn
ATTORNEY.

Patented May 9, 1939

2,158,001

UNITED STATES PATENT OFFICE 2,158,001

PHOTOGRAPHIC CONTACT PRINTING APPARATUS

Harry L. Dazey, Clayton, Mo.

Application February 15, 1937, Serial No. 125,755

5 Claims. (Cl. 95—75)

This invention relates to photography, and more particularly to improvements in photographic contact printing apparatus for reproducing, in positive form, a series of images which have been initially produced on a negative film strip by the usual photographic processes.

As is well known, the conventional camera produces images of a negative character, the light and dark portions of the subject appearing in reverse aspect, or as dark and light areas, respectively, on the film. To rectify this condition, so-called positive prints, wherein the light and dark portions are in agreement with corresponding parts of the subject, are made from the negative film. The two prevailing methods for producing positive prints from a negative film strip are termed "contact printing" and "enlarging". The present invention relates to contact printing which produces positive images identical in dimension to that of the negative image. This invention relates further to the production of positive images on flexible paper or cellulose film.

The principal object of the invention is to provide a contact printing device of the character described, by which all of the operations incident to the printing of images, from loading the printer with film strip to removing the same from the printer for subsequent developing processes, may be performed without resorting to the use of a dark room or changing bag.

Another object of the invention is to provide a photographic printing device of the character described which may be readily operated to reproduce a series of images in the same order or sequence that they appear on the negative film strip, to reproduce the images in any other desired sequential order, or, to omit particular images, the reproduction of which is not desired, without leaving blank spaces on the resultant positive strip.

Yet another object is to provide such a device wherein unintentional exposure of several images to a single positive receiving surface, or so-called double exposure, is effectually prevented; to prevent the unintentional advancing of the positive film without first having exposed the same to a selected negative image, thus avoiding the undesired and uneconomical result of producing blank spaces on the receiving film; to prevent unintentional exposure of a single negative image more than once, resulting in undesired duplication, and further to prevent the unintentional advancement of the negative film before effecting an exposure, avoiding omitting a reproduction of a desired image.

A further object is to provide means whereby a frame, or image bearing area of the negative film strip may be withdrawn from exposing position within the printer and caused to be returned to exposing position without disturbing the positive film or necessitating re-registering the negative film. This feature enables the user to readily observe each negative image immediately prior to exposure thereof for the purpose of determining the proper length of exposure time required.

Yet a further object is to provide means whereby the negative strip may be adjusted in the printer, or moved independently of the positive strip. This feature enables the user to place the first of a series of negative images to be printed in proper registration with the exposure window, so that all succeeding images will register automatically with the exposure window when the negative film is advanced by the printer mechanism. Moreover, this feature enables the negative strip to be readjusted with respect to the exposure window to care for any irregularity in the spacing of the images on the negative strip.

The present device includes means which operate to bring the two film strips into contacting adjacence prior to exposure which is effected by the operation of a shutter. An object of the invention is to provide for a definite operating sequence between the means causing mutual film engagement, and shutter operation, effected by a single motion of the hand of the operator.

Yet a further object resides in the provision of such a device having improved means for indicating the number of exposures made on the positive strip.

A general object is to provide an improved photographic printer embodying all of the foregoing features, which is portable, compact, adapted for use with any available source of light, and which reduces to a minimum the time and labor required to print a film strip.

These and other objects and advantages will appear from the following detailed description of a presently preferred embodiment of my invention wherein reference is made to the accompanying drawings in which.

The foregoing objects and advantages are attained in a printer comprising, briefly, a box-like structure or case which is adapted to have the negative film projected therethrough. A horizontal partition above the plane of the negative strip divides the interior of the case into upper and lower compartments. The lower compartment receives a light-sensitive positive strip which is loaded therein in a manner similar to that of conventional cameras using roll film.

The positive and negative strips are adapted to be pressed together between a stationary, underlying table and a movable, overlying glass platen, which platen is approximately the size of a single image frame. Light for exposing the film is admitted to the platen through a window in the upper compartment, a shutter associated with the window and operative responsive to a control mechanism serving to limit the exposure period.

Movement of the film strips to bring unprinted negative images or frames, and unexposed positive areas into registration with the window is under the control of individual film advancing elements, or sprockets, which normally are interconnected so as to move the strips conjointly. A part of the energy employed in moving the strips as aforesaid, is stored in a spring by which the shutter is subsequently actuated into open position. Manipulation of a control causes, first, the operation of the glass platen, which also serves as a mask, to bring a negative frame underlying the platen or mask into contact with the positive film, and thereafter, the tripping of a detent associated with the shutter spring, causing the movement of the shutter into window open position. Release of the said control, after the desired interval of exposure time has elapsed, results in movement of the shutter to closed position under the influence of a second shutter spring, and thereafter in the lifting of the glass platen. The film strips are normally constrained for joint, intermittent movement, one frame being advanced at a time, and operation of the shutter is required between each film advancing operation. Special provisions are made, however, which enable the user to move the negative film independently of the positive film, and without regard to shutter operation. Accordingly the user can omit the printing of certain negative frames, change the order or position of the images as they will appear on the positive strip, and displace a negative frame from the printer for purposes of determining the proper amount of exposure time required.

The device is specially designed and constructed to exclude light from all parts of the light-sensitive positive film, save a localized area thereof which may be undergoing intended exposure, and yet which may be loaded and operated in day light with facility tantamount to the loading and operating of an ordinary camera.

Describing my improved photographic printing device in greater detail and with reference to the drawings showing a preferred embodiment of the invention, a substantially reniform housing or case, comprising complemental upper and lower sections 20 and 21, respectively, are held together by side plates 22 and 23. The upper section 20 is characterized by spaced lobes 24 and 25, and a rectangular opening, or window 26 in a wall portion which extends horizontally between the said lobes, said opening being preferably provided with a glass closure 26a to exclude dust or other foreign matter.

Figures 1, 2, 20:
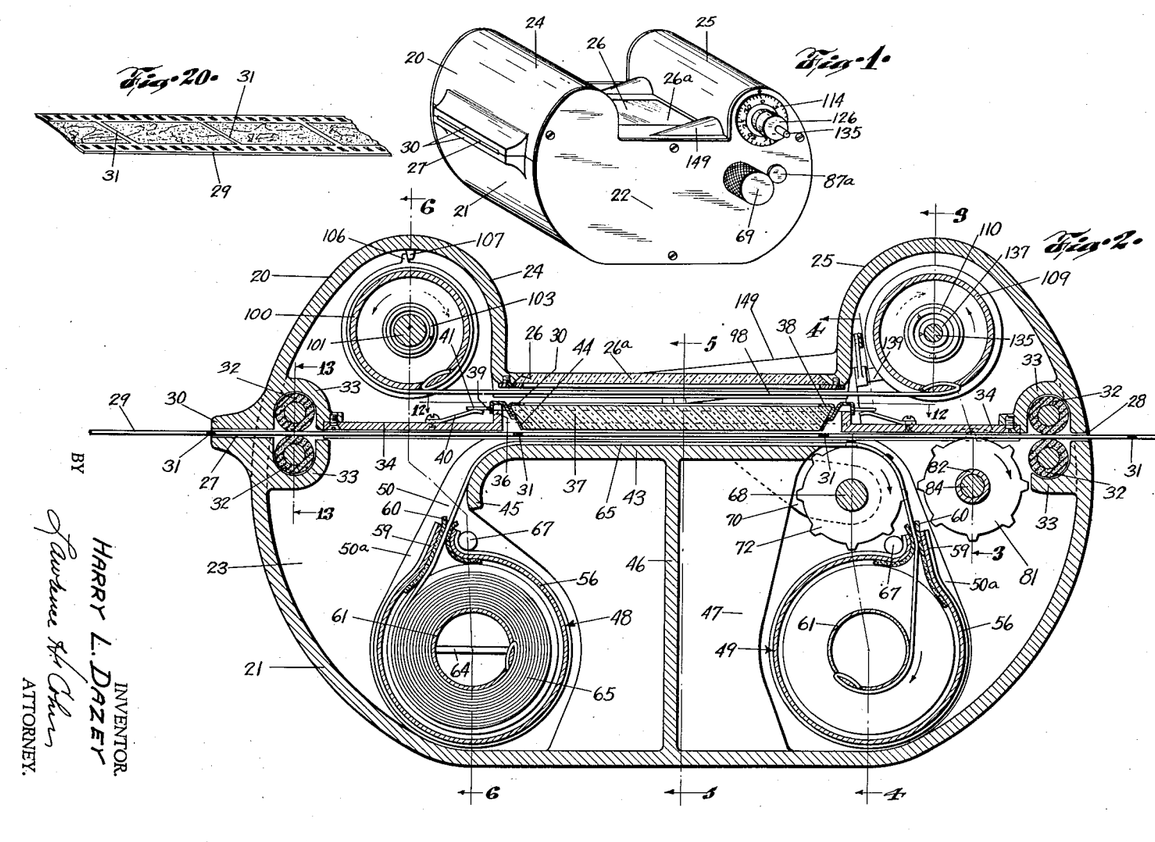
Fig. 1 is a perspective view of the device.
Fig. 2 is a vertical sectional view taken at a longitudinal median plane through the device.
Fig. 20 is a perspective view of a section of film to which the device herein is applicable.

Located at the opposite ends of the case, in the horizontal parting plane of the case sections, are narrow slots 27 and 28, which permit the negative film strip 29 to extend completely through the case, as appears in Fig. 2. A projection, or lip 30 is formed on the case sections at the film entering slot 27, which lip serves as a gauge-piece to enable the user initially to position the negative film so that subsequent automatic feeding thereof by the feeding mechanism will bring the frames in proper registration with the platen. It may be observed from Fig. 2, that the distance between the end of lip 30 and the corresponding end of the platen mask and window 26 is equal to the length of one frame, as defined by the dividing lines 31 on the film. Accordingly, registration of a film dividing line 31 with the end of lip 30 assures the operator that the second preceding frame is in proper registration with the platen mask.

To prevent light from entering the case through slots 27 and 28, a pair of inter-engaging rollers 32, (see Figs. 2 and 13), is provided interiorly of the case adjacent each film slot. These rollers, faced with sponge rubber or the equivalent, are substantially enclosed by, and journalled in inner walls 33. The rollers of each pair engage the film strip 29 therebetween, but do not materially hamper movement of the film as it passes through the case. With their surrounding enclosures, the rollers effectively prevent light from entering the case through the film slots.

Mounted horizontally within the upper case section 20 is a partition member 34 which divides the interior of the case into upper and lower compartments. The lower surface of partition 34 is in the plane of the film slots 27 and 28, and the negative film strip is positioned in and guided through the case by depending flanges 35, (Figs. 5 and 6) on partition 34. Light from window 26 is transmitted to the film through a rectangular opening in partition 34, such opening being preferably dimensioned somewhat larger than the window 26 and being disposed directly below the same. The partition opening is borded by a short, upstanding flange 36 which serves to position the horizontal glass platen 37, the platen being mounted for vertical movement within the partition opening. The platen is secured in a frame 38 having depending flanges 39 which fit about, and slide vertically on the upstanding partition flanges 36. The platen assembly is yieldingly supported in an elevated position by leaf springs 40, (Figs. 2 and 12) secured by screws to partition 34, which springs engage fingers 41 projecting from the ends of the platen frame 38. Projecting horizontally from opposite sides of the platen frame are fingers 42 which are adapted to be acted upon by cams, hereinafter designated and described. The cams function to depress the platen into engagement with the negative film, and to force the positive and negative film into pressure contact between the platen and an underlying table 43. The side and end edges of the platen, which are preferably beveled as shown, may be completely covered by the frame to prevent light from being refracted therethrough into the lower compartment. If the illustrated frame construction is employed, it is desirable to provide an opaque coating of paint or the like, indicated at 44, on the exposed side- and end-edges of the glass platen. The frame 38 or opaque substance serves as a mask to define the area of exposure.

The table 43, forming a part of the lower case section, has its so-called forward, or film-receiving end 45, curved downwardly in the direction of the cartridge that contains unexposed positive film. The table 43 is supported by a vertical, transversely extending medial web 46, and a vertical, longitudinally extending medial web 47, the latter web being relieved at its ends as shown to accommodate the positive film cartridges 48 and 49.

The positive film cartridges are introduced into the lower compartment through an opening which remains in the side plate 23 after a closure panel 50 is removed therefrom. This closure panel extends depthwise from the bottom of the case to the horizontal partition 34, (see Figs. 4 and 5), and its lengthwise extent may be noted from Fig. 2 wherein the end extremities of the closure panel are shown and designated 50a. The mating edges of the closure panel 50 and side plate 23 are complementally rabbeted as indicated at 51, to avoid crevices which might tend to admit light.

The closure panel has an inwardly dished central portion 52, (Fig. 5), to which portion is fixedly secured a manipulating knob 53, disposed wholly within the cavity thus produced. Spring clips 54 mounted on the web 46 releasably engage an inwardly projecting stud 55 on the closure panel, serving to secure the closure panel to the case.

The light-proof film cartridges 48 and 49 are of a conventional type available to the trade, and the particular construction of the cartridges forms no part of the present invention. In the interest of clarity however, the cartridges may be briefly described as follows. A magazine comprising a tube 56, having a fixed annular cap 57 at one end and a removable annular cap 58 at the opposite end, is provided with outwardly projecting lips 59 which define a slot-like film passage. The lips 59 are lined with strips of felt 60, for light sealing purposes. The magazine thus described accommodates a removable film spool, the shaft 61 of which projects beyond one end-flange 62 of the spool and outwardly through the axial end-opening in the removable magazine cap 58. Felt discs 63 between the spool flanges and magazine caps exclude light from the interior of the magazine. The spool shaft 61 consists of a tube which is provided near one end with an internal diametral rib 64 which is adapted to be engaged by a key for winding film on the spool.

Numeral 48 designates a cartridge containing a roll of unexposed film 65. Sufficient film is provided in the cartridge so that an initial length thereof may be used as a leader strip, such being necessary for loading a camera or the herein described printer. An empty film cartridge 49, (Fig. 2), identical to the cartridge 48, is shown with the leader strip extending therein and properly attached to the empty film spool.

As means for positioning the loaded cartridge 48 within the case, coaxial stub shafts 66 and 66a, (Fig. 6), project inwardly from the side plate 22 and the removable closure panel 50, respectively, into the ends of the film spool. The spool is capable of turning freely on the stub shafts 66 and 66a, but the position of the cartridge mouth is substantially fixed by alined rods or fingers 67 which project inwardly from the side plate 22 and closure panel 50 for engagement with the magazine lip 59. The means for positioning the empty cartridge 49 in the casing are similar to the means above described in connection with cartridge 48, with the exception that the stub shaft projecting from the side plate 22 for supporting the cartridge 49 is journalled for rotation on the side plate 22 and provides a positive drive for the empty film spool.

The means for withdrawing the unexposed positive film from cartridge 48, moving it across the exposure table 43, and winding it in the receiving cartridge 49, will now be described. A primary drive shaft 68 projects through a bearing aperture in side plate 22 and is adapted to be turned by a knurled manipulating knob 69 secured thereto externally of the case. The inner end of shaft 68 is journalled in a bearing arm 70 carried by the table 43. Secured to the shaft 68 for rotation therewith is a gear-wheel 71, and a pair of sprockets 72 which are adapted operatively to engage the positive film strip 65 and draw the same across the exposure table 43. A spring-pressed pawl indicated at 73 in Figs. 4 and 11, coacts with gear 71 and constrains shaft 68 for unidirectional rotation, which is shown as clockwise in the accompanying drawings. The gear 71 is operatively connected, through an idler gear 74, to a gear 75 disposed in coaxial, driving relation with film-receiving spool 61. Gears 74 and 75 are journalled on stub shafts 74a and 75a, respectively, which project from side plate 22. Each of the said shafts has a head portion for retaining its associated gear thereon.

Figure 4:
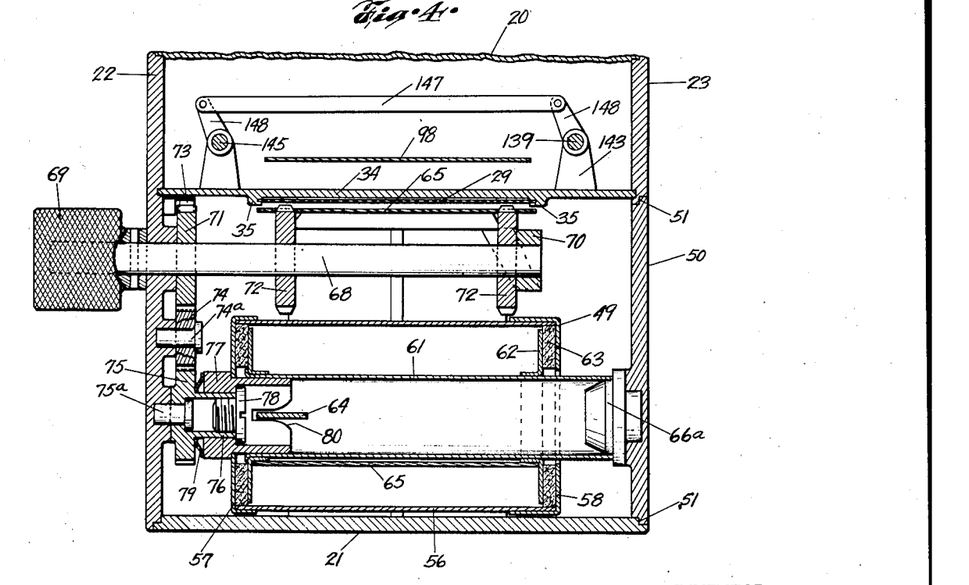
Fig. 4 is a transverse section taken at line 4—4 of Fig. 2.

Since the rate at which the film is taken up by the receiving spool tends to increase as the hub diameter of the spool increases, it is desirable to provide means which act to compensate for the difference in rate of film drive by the shaft 68, and the rate of film take-up by the receiving spool. This is accomplished in the following manner. The driving gear 71 is slightly larger than the driven gear 75, resulting in a slight velocity advantage favoring the latter gear. When the spool is empty, or has but few turns of film thereon, its greater rate of rotation as compared to that of the film sprockets 72, enables it to take up the film as fast as the same is supplied. As the film builds up on the spool, the latter tends to take up the film faster than the same is supplied by the sprockets 72. This velocity differential is rectified by slippage which takes place in a friction coupling disposed between gear 75 and the film spool. Such coupling is shown in Fig. 4. A hollow, internally threaded stub shaft 76 integral with gear 75, fits into a sleeve 77 of stepped internal diameter. A screw 78 threaded in the stub shaft has a head portion which engages an internal shoulder of sleeve 77. A dished washer 79 of resilient metal is constrained between the inner end of sleeve 77 and one face of gear 75, providing a friction driving connection, yet permitting of relative turning movement or slippage between these elements. The force tending to couple the said elements may be adjusted by the screw 78. The outer end of sleeve 77 is provided with a kerf 80 which is adapted to receive the internal rib 64 of the film spool and thereby lock the tube and spool for conjoint rotation.

Automatic advancement of the negative film strip is attained by means of a pair of toothed sprockets 81 which are fixed to a hollow tube or sleeve 82. The uppermost teeth of the sprockets are located in the path of the negative film strip and enter the marginal perforations of the said film strip. The axis of sleeve 82 underlies the negative film and is disposed between primary drive shaft 68 and the film exit slot 28.

The sleeve 82 and associated sprockets 81 are adapted to be driven by means of gear 83 which enmeshes idler gear 74 and, accordingly, is operatively connected to primary driving gear 71. Gears 71 and 83 have the same number of teeth, and therefore the negative strip, when advanced by sprockets 81, and the positive strip advanced by sprockets 72, will move conjointly.

The process of initially inserting the negative film into the printer and causing the film to be properly engaged by the feed wheels 72 is facilitated by means for temporarily disconnecting the sprockets from the gear 83 to permit of free rotation of the said sprockets independently of gear train movement and shutter actuation. The aforesaid independent adjustability of the negative strip is also desirable to enable the user to draw a particular frame across the exposure table without printing the same, to place any particular frame on the exposure table out of its normal order, and to adjust the strip so that the frames will register properly with the exposure window.

It is also desirable to provide means, in addition to those above mentioned, for enabling the user to withdraw a negative frame underlying the exposure window from the case without otherwise disturbing the previously set condition of the film strip, whereby normal intermittent movement thereof by the driving mechanism always brings a frame into exact registration with the exposure window. (The mechanism which compels the film drive to act intermittently is associated with the shutter organization and will be subsequently described.) The purpose of the last mentioned means is to permit observation of a frame immediately before the same is printed, and thereby enable the user to determine the length of exposure time necessary to produce a satisfactory print. In the present device a negative frame which is displaced from the printer for the mentioned purpose may be caused to return automatically to its former, pre-set position within the printer. In carrying out these objects the hereinafter described clutch organizations, operating between gear 83 and feed wheels 81, may be employed.

Gear 83 is carried by, and rotatable relative to a shaft 84 which extends through the sleeve 82 and is journalled at its ends in side plates 22 and 23 of the case. Positive drive of inner shaft 84 by gear 83 is effected through a clutch plate 85 which is keyed to the shaft, yet which is capable of axial movement on the shaft toward and from the side of the gear 83. A spring 86 tends to maintain the clutch plate into frictional operating engagement with gear 83. Disengagement of the clutch plate and gear is effected by means of a plunger 87 movable axially in an end bore in shaft 84, which plunger extends through the side plate 22 for manipulation externally of the case by a button 87a. Inward movement of the plunger is transmitted to the clutch plate through a transverse pin 88 which operates in slot 89 in shaft 84.

Inner shaft 84 is operatively connected to sleeve 82 by means of a resilient coupler, in the present example constituted by a torsion spring 95 on shaft 84, one end 96 of the spring being anchored to the shaft and the opposite end being fixedly secured to one of the sleeve sprockets 81. Thus, rotation of shaft 84 is normally imparted to the sprockets through spring 95, causing the sprockets to turn, yet the sprockets are susceptible of being turned independently of the shaft. Movement of the sprockets from a normal position relative to the shaft is opposed by spring 95. The extent or range of relative angular movement between the shaft and sprockets is limited in the present structure to 720 degrees, or two complete revolutions, by coacting discs 90 and 91, (see also Figs. 8 and 9), disc 90 being fixed to shaft 84 and disc 91 to sleeve 82. Disc 90 is provided with a spiral groove 92 which twice circumscribes one face of the disc, and disc 91 is provided with a radial groove 93. A ball-bearing 94 has opposite sides projecting into the grooves, and is free to move therein when one of the discs is turned relative to the other. Spring 95, under an initial torsional stress, tends to maintain the sleeve 82 in a definite angular position with respect to shaft 84, such position being fixed by ball-bearing 94 which is normally disposed at the upper extremity of the spiral slot 92.

The negative film 29 is adapted to be advanced by the gear 83, under normal conditions of operation, in the following manner. Gear 83 engages and turns clutch-plate 85 which turns shaft 84, spring 95 and sprocket sleeve 82. It should be understood that gear 83 can turn only in the direction to advance the negative film strip, reverse movement of gear 83 being prevented by pawl 73.

The negative film may be displaced in either forward or backward directions without moving gear 83, in accordance with purposes previously described, by depressing plunger 87 to disengage clutch plate 85 from gear 83. Such film displacement, however, disturbs the setting of the film relative to the film advancing mechanism, requiring the film to be re-adjusted to effect proper sequential registration of the frames thereof with the masking platen.

Also in accordance with a previously described purpose, the negative film may be retracted a distance equal to the length of two frames without disturbing the setting as aforesaid. This is accomplished through the agency of the flexible or resilient coupling between shaft 84 and sprocket sleeve 82. If the film strip 29 be grasped at a point adjacent the entrance slot 27 and drawn backwardly, (assuming no manipulation of plunger 87 to disengage gear 83 and clutch plate 85), disc 91 will be caused to turn relative to disc 90, ball bearing 94 moving radially inwardly in slot 93 and riding through the spiral slot 92 in the now stationary disc 90. Two revolutions of disc 91 relative to disc 90 can be effected before the ball bearing reaches the lower extremity of the spiral slot, corresponding to two frames of film displacement. It will appear that backward displacement of the film under the aforesaid conditions will wind spring 95, with the result that when the film is released, unwinding of spring 95 will cause the film to be restored exactly to its previously set position. Rotation of the film sprocket to return the negative film is arrested by the ball-bearing returning to the upper slot extremity, which occurs when the film reaches its previously set position.

Figures 5, 7:
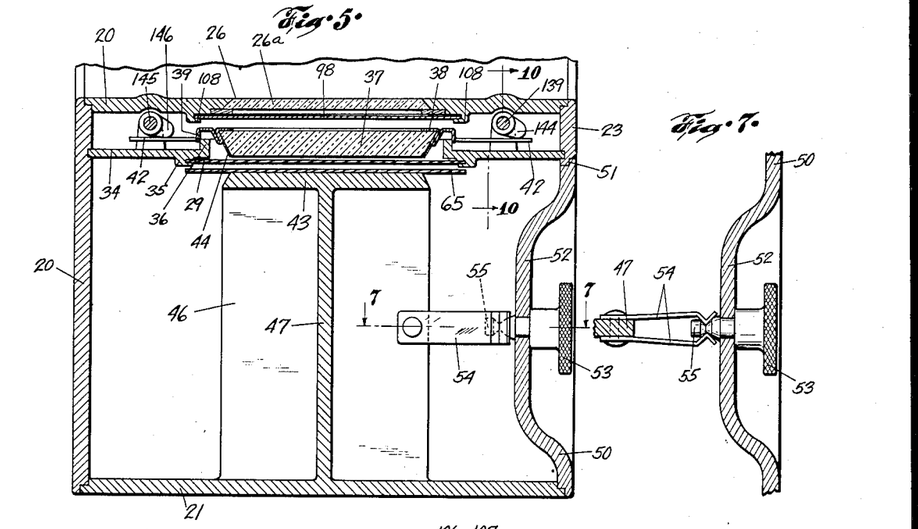
Fig. 5 is a transverse section taken at line 5—5 of Fig. 2.
Fig. 7 is a fragmentary horizontal section taken at line 7—7 of Fig. 5.
Figures 6, 8, 9:
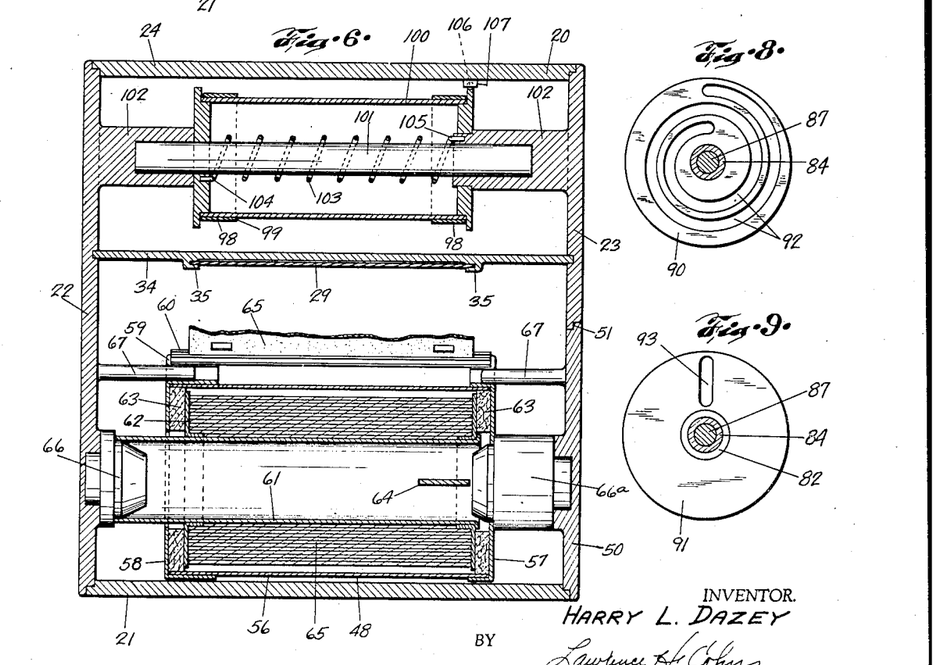
Fig. 6 is a transverse sectional view taken at line 6—6 of Fig. 2.
Figs. 8 and 9 are plan views of two cooperating parts employed in the mechanism which permits a negative image to be viewed immediately prior to exposure. These parts are also shown in section in Fig. 3.

Describing now the shutter organization and its actuating mechanism, the shutter proper 98, (Fig. 19) comprises a flexible, opaque curtain having a rectangular light-transmitting opening, or transparent area, 99 therein. The shutter is secured at one of its ends to a drum 100 which is carried by and journalled on a transverse shaft 101, (Fig. 6), mounted on inwardly projecting stubs 102 on the side plates 22 and 23. A torsion spring 103, on shaft 101 internally of drum 100, has one end 104 secured to and movable with the drum, and the opposite, stationary end 105 anchored in an adjacent shaft stub 102. Spring 103 opposes counterclockwise rotation, (Fig. 2), of the drum, and tends to maintain the curtain in a "closed" position, or such that the curtain opening 99 is disposed to the left of, and completely out of registration with the exposure window 26. Drum 100 may, for convenience and clarity, be termed the shutter-closing drum, and spring 103, the shutter-closing spring. Rotation of the drum 100 in the direction to close the shutter is limited by the engagement of a radially projecting finger 106 on the drum with a stop lug 107 depending from the upper case section 24. The shutter is positioned, and its movement across the inner face of the exposure window 26 is guided by longitudinally extending flanges 108 depending at opposite sides of the window, such flanges having grooves which receive the side edges of the shutter as shown in Fig. 5.

Figure 3:
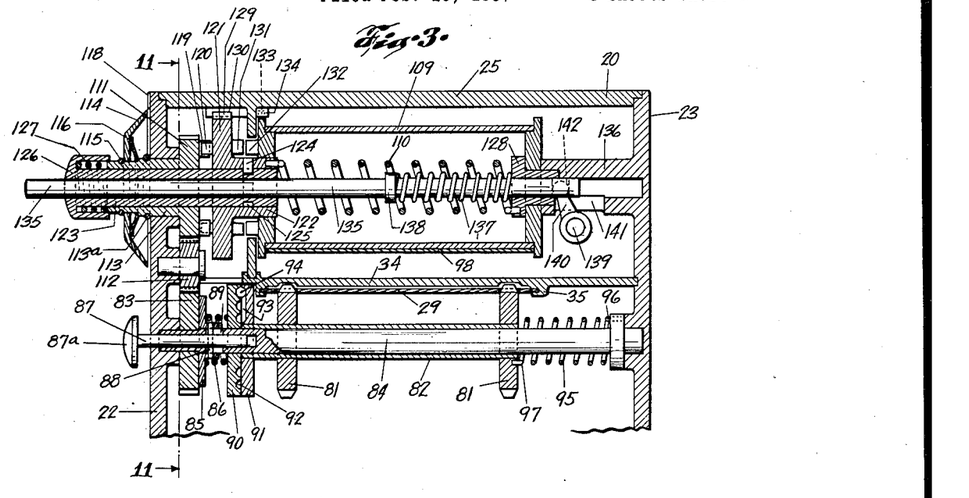
Fig. 3 is a transverse section taken at line 3—3 of Fig. 2.

The opposite end of the shutter strip is secured to a so-called shutter-opening drum 109, appearing in section in Fig. 3. The drum 109 is adapted to be actuated to draw shutter 98 into window open position by means of a torsion spring 110 which is relatively "stronger" than shutter-closing spring 103. Spring 110 is wound by a gear 111 which is driven by gear 83 through an idler gear 112. Gear 111 is provided with an integral axial sleeve 113 which projects through, and is journalled in the side plates 22 of the case. A retaining ring or band 113a is seated in a circumferential groove in sleeve 113 adjacent the outer face of side plate 22, permitting gear 111 and its sleeve 113 to rotate, yet preventing axial displacement thereof. Mounted on sleeve 113 externally of the case is a circular dial plate 114 which is normally constrained by frictional means to turn with the sleeve, yet which may be turned relative to sleeve for resetting purposes, as will be hereinafter more fully explained. Thus, a retaining ring 115 positions the dial 114 axially on sleeve 113, and the dial is frictionally clamped between the retaining ring 115 and a dished, resilient washer 116 which is positioned by a shoulder formed on sleeve 113. The dial is provided with a series of calibrations or markings 117, (Fig. 14), any of which, when alined with a fixed marking 118 on side plate 22, indicates the number of shutter operations and accordingly registers the number of exposures that have been made.

Figures 10, 11, 12, 13, 14, 15, 16, 17, 18, 19:
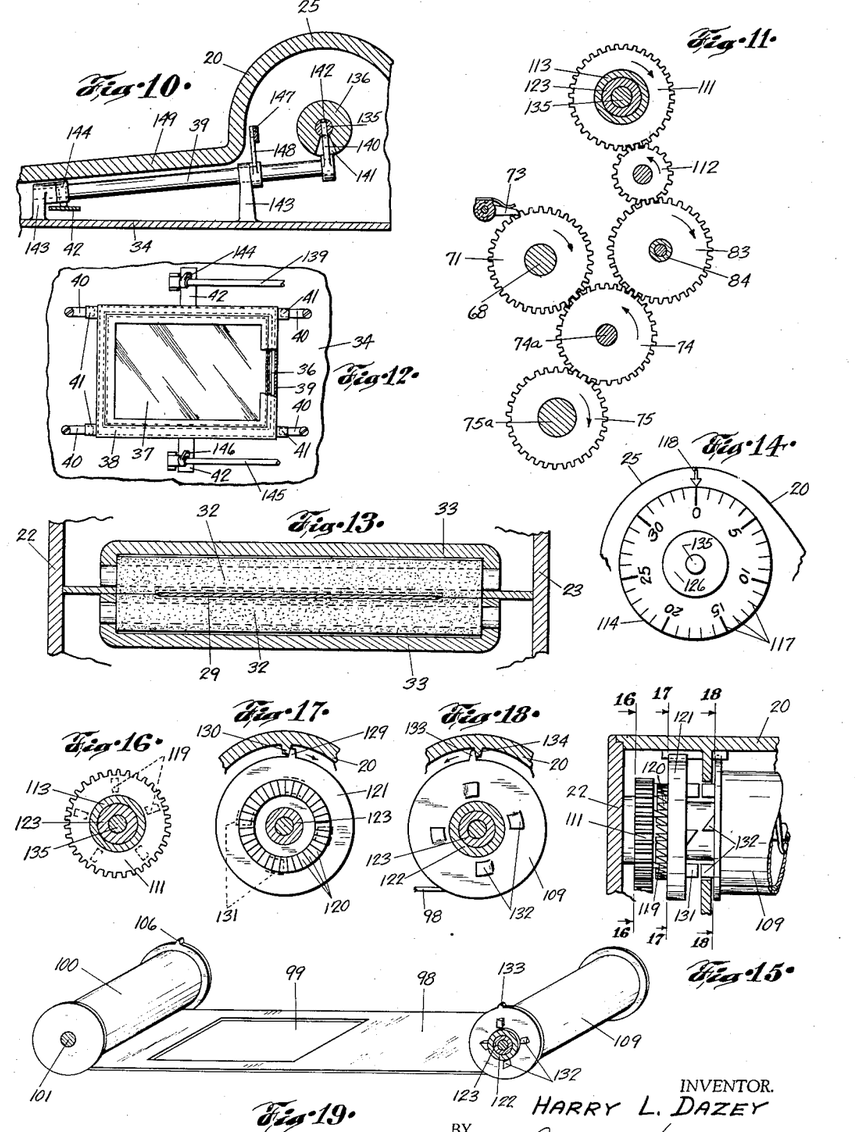
Fig. 10 is a fragmentary vertical section taken at line 10—10 of Fig. 5.
Fig. 11 is an elevation as viewed from line 11—11 of Fig. 3, and showing the gear train which operatively interconnects the various film and shutter drives.
Fig. 12 is a fragmentary plan view of the film platen, as viewed from a plane indicated by line 12—12 of Fig. 2.
Fig. 13 is a vertical section through paired light-sealing rollers, taken at line 13—13 of Fig. 2.
Fig. 14 is a plan view of the dial for indicating the number of exposures which have been made.
Fig. 15 is an elevation showing the clutch mechanism associated with the shutter drive. This mechanism also appears in section in Fig. 3.
Figs. 16, 17 and 18 are sectional views showing elements constituting the clutch mechanism appearing in Fig. 15, the sections being taken at lines 16—16, 17—17 and 18—18, respectively, of Fig. 15.
Fig. 19 is a perspective view of the shutter assembly per se.

Gear 111 is provided on its inner face with a series of ratchet teeth 119 which are engageable with a complemental series of ratchet teeth 120 on the outer face of an axially movable clutch plate 121. Clutch plate 121 is provided with a hub portion 122, and is mounted on the inner end of a sleeve 123 for rotation relative thereto. A pin 124 on hub 122 projects into a circumferential groove 125, permitting rotation of the clutch plate relative to sleeve 123, yet constraining the same for axial reciprocating movement by the said sleeve. Sleeve 123 extends through sleeve 113 and is provided at its outer extremity with a cap 126. A compression spring 127 mounted within cap 126 functions to urge clutch plate 121 toward gear 111 and effect interengagement of ratchet teeth 119 and 120, as shown in Figs. 3 and 15. One end of the shutter-opening torsion spring 110 is fixed to the clutch plate hub portion 122, and the opposite end of said spring is anchored in a stationary bearing element 128 upon which element shutter drum 109 is adapted to rotate. Now, since clutch plate 121 is normally inter-locked with gear 111, rotation of the latter operates to wind or energize shutter-opening spring 110, the drum 109 remaining stationary during this operation. This initial angular movement of clutch plate 121 is limited by the engagement of a radial finger 129 on the clutch plate with a stop shoulder 130 formed on the upper casing section 20, and rotation of the clutch plate is thereby limited to substantially one revolution.

When pressure is applied to cap 126 to displace clutch plate 121 axially inwardly (such displacement being yieldingly opposed by spring 127) ratchet teeth 131 on the inner face of clutch plate 121 engage ratchet teeth 132 projecting from the adjacent end face of the drum 109. Continued inward movement of the clutch plate tends to free the ratchet teeth 120 thereon from gear ratchet teeth 119, and when the said teeth are completely disassociated the clutch plate is free to rotate under the unwinding action of shutter opening spring 110. Rotation of the clutch plate as aforesaid is transmitted to the drum 109 through ratchet teeth 131 and 132, said drum being caused to turn in a counter-clockwise direction (Fig. 2), substantially one complete revolution, and thereby displace the shutter strip 98 to window-open position. It has been previously mentioned that shutter opening spring 110 is stronger than shutter closing spring 103 associated with drum 100, and accordingly spring 110 dominates shutter movement during the presently described stage of shutter operation. It will appear that the dominating spring 110 also serves to wind spring 103 as the shutter is drawn to window open position.

After the desired length of exposure time has elapsed, the user releases actuating cap 126, allowing the clutch plate 121, under the action of compression spring 127, to return to its former position. Immediately upon relative disengagement of ratchet teeth 131 and 132, drum 109 becomes free to rotate to shutter-closed position under the unwinding action of spring 103 associated with drum 100. Rotation of drum 109 as aforesaid is limited by the engagement of radial finger 133 on drum 109 with stop shoulder 134 on upper case section 20. Thus, all of the elements of the shutter organization are restored to their former positions and in condition to effect a subsequent exposure.

Explaining now the manner in which dial 114 functions to indicate the number of exposures that have been made, it will appear that dial 114 rotates clockwise (Fig. 14) with gear 111 when such gear turns to wind shutter opening spring 110. The tooth ratio between gears 83 and 111 is such that one complete turn of gear 83 results in less than a full turn of gear 111, and the angular differential corresponds to a single space of the dial calibrations. In the present example gear 83 is provided with thirty-four teeth and gear 111 with thirty-five teeth. Each full revolution of gear 83, (resulting from a full revolution of gear 71 which advances the positive film one frame), causes gear 111 to be turned through an angle corresponding to only thirty-four of its thirty-five teeth. Since dial 114 is divided into thirty-five spaces, it will be turned through only thirty-four of such spaces and come to rest at the next higher marker on the dial scale.

The means for operating platen 37 will now be described. Associated with the shutter operating organization is a push rod 135 that extends axially through sleeve 123 and normally projects outwardly beyond cap 126. The opposite end of the push rod extends through bearing element 128 and slides axially in a bore formed in an inwardly projecting stud 136 on side plate 23. A compression spring 137 is confined between a collar 138 secured on rod 135 and the end face of bearing element 128, said spring being adapted to oppose inward movement of the rod. Inward movement of rod 135 causes a shaft 139 to rock, said shaft being operatively connected to the rod by means of a lever arm 140 which projects through a slot 141 in stud 136, and into a recess 142 in the push rod 135. The shaft 139 is journalled in a pair of bearing arms 143, (Fig. 10), projecting upwardly from partition 34, and terminates in a cam 144 which coacts with one of the lateral arms 42 on platen 37. Disposed at the opposite side of the platen, parallel to shaft 139, is a shaft 145 which is provided with a cam 146 coacting with the other platen arm 42. The shafts 139 and 145 are interconnected for conjoint rocking movement by a link bar 147, the opposite extremities of which are pivotally connected to rocker arms 148 secured to shafts 139 and 145. To accommodate the shafts 139 and 145 within the case or housing, the upper section 20 has upwardly protruding shell portions 149.

It will now appear that inward pressure on push rod 135, as by the thumb of the operator, initially displaces the rod axially inwardly, causing platen actuating shafts 139 and 145 and their cams 144 and 146 to rock in a clockwise direction, Figs. 4 and 5), and thereby depress platen 37. With a continued inward movement of the operators thumb on push rod 135, subsequent sequential engagement and inward movement of shutter control cap 126 is effected, resulting in the shutter opening operation hereinabove explained. After the desired length of exposure time has elapsed the operator releases his thumb from the combined shutter and platen controls, allowing them to move outwardly under the action of springs 127 and 137. Such movement results in the shutter being displaced to closed position and the platen being sequentially elevated by leaf springs 40, all as has been previously explained.

The method of using and operating my improved photographic printing device is believed to be clear from the foregoing description, but for purposes of completeness may be set forth as follows:

The leader strip, projecting from a light-proof magazine containing a roll of unexposed positive film, is attached to an empty spool and the latter is installed in a second light-proof magazine. The two magazines or cartridges are then inserted into the lower compartment of the printer through the side opening therein remaining after the closure panel 50 has been removed, the length of leader strip between the cartridges being stretched over the table 43 and engaged by sprockets 72. Care should be taken to have the empty film spool engaged by the winding key 77 associated with gear 75. The closure panel 50 is then replaced, rendering the lower compartment completely light-tight. It is now necessary to bring an unexposed portion of the positive film into registration with the masking platen and exposure window, and this is accomplished by turning the knob 69. Knob 69 can be turned only one revolution to advance the film a single frame-length, and then it is necessary to trip the shutter by pressing and releasing shutter control cap 126 before a subsequent film advancing operation can be effected. Two of such film advancing operations will ordinarily be sufficient to place an unexposed portion of the film under the window. It will be remembered that the shutter opening spring is wound concomitantly with the previous film advancing operation, hence the shutter organization will function when the control cap is again forced inwardly.

The negative film strip 29 may now be inserted into the end slot 27 and impelled through the printer. By pressing button 87a, (to disengage negative film sprockets from the driving mechanism), as the negative strip is being initially threaded through the printer, proper engagement of the strip by feed wheels 81 may be readily effected. With button 87a held inwardly, the negative film is adjusted to bring the second frame-dividing-line 31 succeeding the frame selected for initial printing into exact registration with the extremity of lip 30. Button 87a may now be released, causing reengagement of feed wheels 81 with the driving mechanism. Now, if it is desired to withdraw the selected frame from the printer for observation to determine the proper length of exposure time required, and return the said frame to its former precise position beneath the exposure window for subsequent printing, the same may be accomplished through the operation of the resilient coupling and discs 90 and 91, as previously described.

Consecutive operation of platen 37 to press the subjacent film frames together, and movement of the shutter to open position are next effected in the time order mentioned by inward manipulation of push rod 135 and shutter control cap 126, such manipulation being readily effected by a single stroke of the operator's thumb. The said control elements are held inwardly until the desired number of seconds of film exposure have elapsed, and thereafter are released, causing the shutter to be moved automatically to closed position and the platen to raise. Both films may now be concurrently advanced one frame length by rotation of the film feeding knob 69, and the shutter again caused to open and close in the manner previously described. If it is desired to change the positional order of the reproduced images as compared to the order of the original images, or to print only certain selected images, the same may be accomplished by moving the negative film relative to the positive strip (after depressing button 87a) and placing the desired negative frame under the exposure window.

From the foregoing description and accompanying drawings it will appear that the invention provides a photographic printing device which may be used without resorting to a darkroom or changing bag; which is simple to operate, and which in general attains the objects hereinabove set forth.

Having described the invention with reference to a single, preferred embodiment thereof, it should be understood that various changes may be made in the construction and mechanisms set forth in the present specification, without departing from the spirit and full intendment of the invention as defined by the appended claims.

I claim as my invention:

1. In a photographic printing apparatus including a casing having means therein defining a printing zone, means for moving negative film through said zone including a rotatable drive element, a film sprocket, and a coupling device operatively interconnecting said drive element and sprocket comprising means for positively limiting angular movement of the sprocket in one direction relative to said drive element, and a spring tending to maintain the sprocket in its limit position relative to the drive element, said sprocket being adapted for independent rotation to permit film engaged thereby to be withdrawn from the printing zone without disturbing the angular setting of the drive element, said spring operating to return the film to its former position in the printing zone following such withdrawal.

2. In a photographic printing apparatus including a casing having means therein defining a printing zone, a pair of sprockets adapted respectively to move positive and negative film in fixed relation through said printing zone, a rotatable drive element common to said sprockets, and a coupling device interposed between the negative sprocket and drive element adapted to permit angular displacement of the negative sprocket relative to said drive element and thereafter operating to restore the negative sprocket to its former angular position relative to said drive element, said coupling device comprising means for positively limiting rotation of the negative sprocket in one direction relative to said drive element, and a spring tending to maintain said sprocket in its extreme relative angular position.

3. In a photographic printing apparatus including a casing having means therein defining a printing zone, means for advancing positive and negative film strips in fixed relation through the printing zone including a positive film sprocket adapted for unidirectional rotation, a rotatable element geared to said positive film sprocket, a negative film sprocket and a yieldable coupling device interconnecting said element and negative sprocket, adapted to permit rotation of the negative sprocket relative to the positive sprocket, said coupling device including means for positively limiting relative movement of the sprockets and a spring tending to maintain the negative sprocket in an extreme position relative to the positive sprocket, said coupling device enabling the negative film to be displaced from and restored to a definite predetermined position relative to the positive film.

4. In a photographic printing apparatus, a casing having means therein defining a printing zone, a pair of sprockets adapted respectively to move positive and negative film through said printing zone, means operatively interconnecting said sprockets adapted normally to maintain a definite predetermined angular relationship therebetween, said means including a coupling device adapted to permit relative displacement of the sprockets and to restore the sprockets to their former definite angular relationship following such displacement, said coupling device having coacting abutment portions and a spring tending to urge said portions into abutting relation.

5. In a photographic printing apparatus, a casing having means therein defining a printing zone, a sprocket for advancing positive film through said printing zone, means for preventing reverse rotation of the positive sprocket, a sprocket for advancing negative film through the printing zone, means operatively interconnecting said sprockets adapted normally to maintain a definite predetermined angular relationship therebetween, said means including a clutch releasable to permit free movement of the negative relative to the positive sprocket and a yieldable coupling device adapted to permit relative displacement of the negative sprocket and to restore the same to its former angular position following such displacement, said coupling device having coacting abutment portions and a spring tending to urge said portions in abutting relation.

HARRY L. DAZEY.